Aug. 17, 1965  J. J. ROOT  3,201,279
BATTERIES
Filed Feb. 23, 1960

INVENTOR.
JOHN J. ROOT
BY Krazinski & Nolan
ATTORNEYS

United States Patent Office 3,201,279
Patented Aug. 17, 1965

3,201,279
BATTERIES
John J. Root, Bronx, N.Y., assignor, by mesne assignments, to The Electric Storage Battery Company, Philadelphia, Pa., a corporation of New Jersey
Filed Feb. 23, 1960, Ser. No. 10,447
14 Claims. (Cl. 136—6)

This invention relates to batteries and more particularly to batteries having high capacities and long shelf life.

Currently used batteries have many limitations. For example, they usually are incapable of delivering the most efficient current drains. With the conventional battery, it would be necessary to have a great many cells to fulfill the required demand for a hundred ampere drain during a period of an hour. Again, in the normal operation of a conventional zinc-silver halide secondary battery, for instance, the formation of zinc after the plating of about 1 mil on the negative electrode becomes irregular. As a result, the spacing between cathode and anode is varied with a consequential increase in the electrical resistance between the plates. In addition, in conventional systems, such as the silver chloride-zinc battery, the storage or idling of the charged cells results in a dropoff not only of the potential but also in the capacity of such battery.

In accordance with this invention, batteries are provided which have most efficient current drains and a single cell may have as great a current drain during a unit period as a plurality of currently used cells. Moreover, by means of an electrode construction, secondary batteries of this invention effect a relatively even plating on the negative electrode during recharging so that spacing between electrodes is relatively uniform with a resulting maintenance of desired conductance between plates. Finally, by the utilization of an electrolyte system, the potential and capacity of charged cells do not drop significantly during storage or while idling.

An object of this invention is to provide high capacity primary and secondary batteries which have high current density and relatively small losses in capacity and potential during storage.

Another object of this invention is to maintain relatively uniform the conductance between plates of secondary batteries and to retard the deterioration of the electrodes of batteries.

A battery of this invention includes positive and negative electrodes, separators between the electrodes and electrolytic paths. Each path contacts and forms with the electrodes an electrolytic cell. While the number of electrolytic paths which contact the pair of electrodes may vary over wide limits, such as 1 to 1000 paths per square centimeter of each electrode, a plurality of such paths, such as 10 to 100 paths per square centimeter of electrode, is desirably employed. The cross-sectional area of the electrolytic paths may also vary over wide limits, but desirably such cross-sectional areas are within the range of 40 square microns to 1 square millimeter. Preferably, each of the paths forms with the electrodes an electrolytic cell having approximately the same current density as that of the other paths. In this way, the storage flow of a battery can be readily metered by simply constructing additional electrolytic paths through at least one of the electrodes and separators of a battery to obtain, within relatively wide limits, substantially any desired capacity. For the effective operation of the battery, it is essential that little or no significant electrolytic connection be effected between the electrodes of the cell other than through the constructed electrolytic paths. One means of restricting substantially the passage of the current through the constructed electrolytic paths is to insulate at least one of the electrodes from the electrolyte except through a constructed electrolytic path or paths. The electrolytic path or paths may pass through one or both electrodes so long as little or no significant connections exist other than through the path or paths.

Significant losses in capacity and potential during storage of the substantially non-soluble metallic halide type battery are avoided by the utilization of an alkaline electrolyte system. This type of battery includes a positive electrode comprising a substantially non-soluble halide which is more electro-positive than hydrogen, such as silver chloride or cuprous chloride and a negative electrode of a metal which is more electro-negative than hydrogen, such as zinc or cadmium. The electrolyte employed is an alkaline electrolyte within the range, for example of pH 7 to 11, such as pH 10, and contains sufficient halide ions to maintain the substantially non-soluble halide in the form in which it is on the electrode without the formation of the corresponding oxide. For example, if the positive electrode comprises silver chloride, there are sufficient chloride ions in the electrolyte to maintain the silver chloride in that form without producing significant amounts of the corresponding oxide. Likewise, if the positive electrode is silver bromide or silver iodide, the electrolyte contains sufficient bromide or iodide ions respectively to prevent the formation of significant amounts of silver oxide. If desired for certain situations, a plurality of different halide ions may be contained in the electrolyte.

One convenient method of producing a silver chloride electrode is to mix silver chloride with powdered metallic silver or silver oxide, for example up to 25% of either metallic silver or silver oxide or combined. This can be produced in the form of a paste or in the form of pressed dry powders or in a melted molded composition.

Alternatively the mixture comprising the silver chloride with metallic silver or silver oxide can be affixed to a suitable metal wire mesh screen which acts as a matrix.

The electrolyte may contain additives, such as small amounts of depolarizers, for example, chromates such as potassium dichromate and phosphates, such as potassium phosphate.

The electrolyte may be prepared in any convenient manner for the desired alkalinity and content of halide ions. One method found satisfactory is to dissolve the alkaline substance such as potassium hydroxide in water and to adjust the pH of the resulting solution with an acidic halide, such as zinc chloride or hydrochloric acid. In the case of zinc chloride, zinc hydroxide, an amphoteric substance, is precipitated and goes into solution to form $H^+$ ions, $HZnO_2^-$ ions, $Zn^{++}$ ions and $OH^-$ ions. Sufficient chloride ions are also provided to react with the nascent silver oxide to form silver chloride during the charging cycle. The two solubility product equations are arrived at when $Kb$=the basic constant and $Ka$=the acidic constant and applied to the concentration for the zinc ion:

$$(Cn^{++}) = \frac{Kb}{(OH^-)^2}$$

$$(HZnO_2^-) = \frac{Ka}{H^+} \text{ or } (HZnO_2^-) = \frac{Ka}{KH_2O}(OH^-)$$

Other chlorides may be incorporated in the electrolyte such as lithium chloride. In such case it would be necessary to have present a sufficient amount of anions to provide a chloride cation which, during the charging cycle, would convert any nascent silver oxide on the surface of the anode to silver chloride and during the discharge cycle would cause a definite amount of the amphoteric zinc hydroxide to go in solution as zinc chloride to be recovered as metallic zinc on the negative electrode.

Examples of battery systems in which the alkaline electrolyte may be employed are: those having a positive electrode comprising insoluble silver halide such as silver chloride, silver bromide or silver iodide or an insoluble cuprous halide such as cuprous chloride and a negative electrode such as zinc, cadmium or tin. The insoluble cuprous halide may be employed as a component of the positive electrode by completely encasing an insoluble cuprous halide such as cuprous chloride with an insoluble silver halide such as silver chloride and providing sufficient halide ions such as chloride ions in the alkaline electrolyte to maintain the insoluble cuprous halide and insoluble silver halide in those forms without significant formation of their corresponding oxides.

Another modification is to have the positive electrode comprise a copper matrix having mercury amalgamated on its surface with either silver or an insoluble silver halide, such as silver chloride, adjacent the mercury amalgam. Such modification may be adopted as an economy measure to save silver. If metallic silver is employed, it is converted on charging to silver halide, such as silver chloride if chloride ions are present in the electrolyte, and on discharge, the resulting silver chloride is converted to metallic silver.

Secondary batteries of this invention maintain a relatively uniform resistance between plates. This result is achieved by an electrode construction whereby a relatively even plating on the negative electrode is effected during recharging. The negative electrode of such secondary batteries includes a matrix more electropositive than hydrogen, such as copper, and has amalgamated with the matrix a metal more electro-negative than hydrogen, such as zinc or tin. Copper is particularly advantageous as the matrix since it is relatively non-brittle. Such copper matrix could be amalgamated with both zinc and a metal more electro-positive than zinc, such as tin. If such other metal is also more electro-negative than hydrogen, it will be displaced in the amalgam after all of the zinc has been taken therefrom in the discharging cycle but yet will leave the copper matrix intact. In such a case, the copper of the matrix would not form a salt to be dissolved in the electrolyte unless and until all of the tin in the amalgam had been removed.

One convenient construction for the secondary battery including the negative electrode comprising the amalgam is to employ an insulated separator on one side of which and integral therewith is a negative electrode including a matrix of a metal more electro-positive than hydrogen such as copper and, amalgamated with that matrix, is a metal more electro-negative than hydrogen such as zinc or tin. On the other side of the separator is a positive electrode, such as silver chloride.

The metal more electro-negative than hydrogen, such as zinc, may be amalgamated with the copper-mercury amalgam by depositing thereon powdered zinc or alternately electro-plating such material on the copper amalgam.

A more comprehensive understanding of this invention may be obtained by reference to the accompanying drawing in which.

Figure 1:
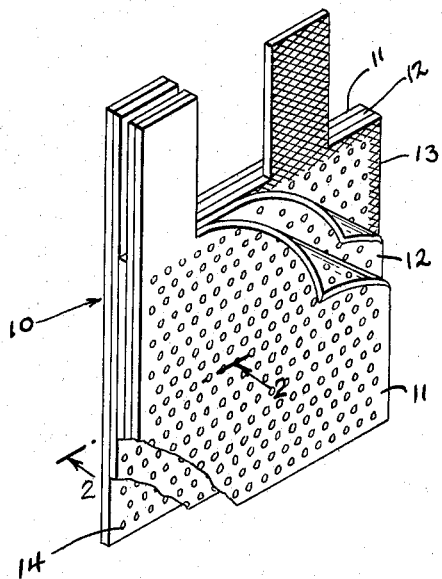
FIG. 1 shows a battery partly in section.
Figure 2:
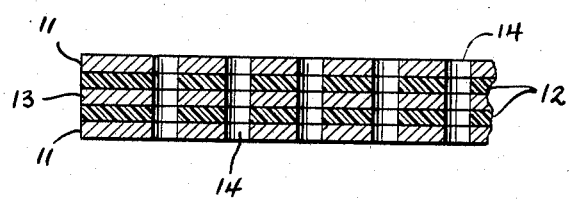
FIG. 2 is a section taken along the arrows 2—2 of FIG. 1.

In the drawing, a battery 10 includes two negative electrodes, 11, 11. These electrodes 11, 11 which may be electrically joined together, encase a silver chloride electrode 13 which is separated by insulated separators 12, 12. The insulated separators may be of any suitable material, such as polyethylene. The negative electrodes 11, 11 comprise copper matrices having amalgamated with them a metal or metals, such as zinc, which are more electronegative than hydrogen. Through the laminated structure comprising the negative electrodes 11, 11, the insulated separators 12, 12 and the silver chloride electrode 13 are drilled a plurality of holes 14, each of which has a cross-sectional area of approximately 1,000 square microns. These holes are distributed uniformly over the surface of the electrodes so that there are 100 holes per square centimeter.

The battery 10 is immersed in an electrolyte consisting of a 6 N aqueous solution of potassium hydroxide to which has been added sufficient zinc chloride to adjust the electrolyte to a pH of 10. Each of the holes 14 is an electrolytic path and forms with the negative electrodes 11, 11 and the positive electrode 13 an electrolytic cell. Each of the electrolytic cells has approximately the same current density as that of the other electrolytic cells. In the discharge of the battery, the sum total of the current density for a unit period is the additive density of each of the cells. Consequently, the battery structure affords an excellent method of metering the storage flow of a battery by simply constructing additional electrolytic paths through the electrodes and separators of the battery.

The mercury of the amalgam of the negative electrode acts as an inhibitor of local electrolysis since, when another metal or plurality of metals are amalgamated with mercury, the metal which is highest in the electromotive series leaves the amalgam first and later on the other metals, in the order of their position in the electromotive series.

Upon charging, zinc deposits on the electrodes 11, 11 in the areas of holes 14. The mercury amalgamates with the zinc and spreads it towards the sides of the zinc plate 11, 11 thereby acting as a reservoir of zinc and keeping the metal exposed at hole 14 free for the flowing of electrolyte. On discharge, the zinc migrates to the exposed edges of holes 14 to be converted electrolytically to zinc chloride.

In charging the silver chloride battery a voltage not higher than 1.5 to 1.65 volts should be applied to insure complete chloride formation on the positive electrode. As long as the charging potential is maintained at the terminal potential of the battery (1.5 to 1.65 volts) no oxide formation can form on the silver chloride electrode; hence there will be no gassing.

On the other hand in the event of a deliberate overcharge or a higher charging potential, for example, 2 volts, is applied a silver oxide forms. In that event the battery operates as a silver oxide-zinc battery and after the first discharge it comes back to the normal state and if another charging cycle of proper potential is applied it returns to the normal silver chloride-zinc battery condition.

Since the battery shown in the drawing does not gas significantly, it may be hermetically sealed.

If the battery is to be employed as a primary battery, the alkali content of the electrolyte is made higher until a terminal potential of 1.8 or 1.9 is obtained, thereby securing a greater current output for the same electrode area. However, when the electrolyte is adjusted to this state, it is not possible to recharge it.

What is claimed is:

1. A battery comprising a positive electrode, a negative electrode, said electrodes being immersed in an electrolyte, an electrolyte-impervious separator between said electrodes, and a plurality of electrolytic paths formed by perforations through at least one of said electrodes and said separator, said electrode perforations and separator perforations being aligned.

2. A battery in accordance with claim 1 in which said electrolytic paths have a cross-sectional area ranging from about 40 square microns to 1 square millimeter.

3. A battery in accordance with claim 1 in which the number of said aligned electrolytic paths ranges from about 1 to about 1000 paths per square centimeter.

4. A battery in accordance with claim 1 in which the positive electrode comprises a substantially insoluble halide of a metal which is more electro-positive than hydrogen and which is substantially free of electrically reducible metal oxides, the negative electrode comprises a metal which is more electro-negative than hydrogen, and the alkaline electrolyte in which said electrodes are immersed contains sufficient halide ions to maintain said insoluble halide in that form without the formation of significant amounts of corresponding oxide.

5. A battery in accordance with claim 4 in which the substantially insoluble halide is a chloride and the halide ions present in the electrolyte are chloride ions.

6. A battery in accordance with claim 1 in which the positive electrode is a silver halide electrode susbtantially free of electrically reducible silver oxides, the negative electrode comprises a metal which is more electro-negative than hydrogen, and said electrolyte comprises an alkaline solution containing sufficient halide ions to maintain said silver halide in that form without significant formation of silver oxide.

7. A battery in accordance with claim 6 in which said negative electrode active material is zinc.

8. A battery in accordance with claim 1 comprising a positive cuprous chloride electrode, a negative electrode of a metal which is more electro-negative than hydrogen, and an alkaline electrolyte containing sufficient halide ions to maintain said cuprous halide in that form without significant formation of copper oxide.

9. A battery in accordance with claim 8 in which said negative electrode active material is zinc.

10. A battery in accordance with claim 1 in which the positive electrode comprises cuprous chloride substantially completely encased with silver chloride, a negative electrode of a metal more electro-negative than hydrogen, and an alkaline electrolyte containing sufficient chloride ions to maintain said cuprous chloride and silver chloride in those forms without significant formation of their corresponding oxides.

11. A battery in accordance with claim 1 in which said positive electrode is substantially free of electrically reducible metal oxides and comprises a copper matrix, a film of mercury amalgamated with said copper and an active material selected from the group consisting of silver and silver halides adjacent to said mercury, said negative electrode comprising a metal which is more electro-negative than hydrogen, and said electrolyte containing sufficient halide ions to maintain any compound of silver in the battery in the form of silver halide without significant formation of silver oxide.

12. A battery in accordance with claim 11 in which the positive active material is silver chloride and the negative active material is zinc.

13. A battery in accordance with claim 1 in which the electrolyte-impervious separator is placed between a positive silver chloride electrode and a negative electrode comprising a copper matrix amalgamated with zinc.

14. A battery in accordance with claim 1 comprising a positive electrode which contains an active material substantially free of electrically reducible metal oxides and is selected from the group consisting of silver and silver halides, and a negative electrode comprising a copper matrix having amalgamated therewith zinc and a metal which is more electro-positive than zinc.

References Cited by the Examiner

UNITED STATES PATENTS

| | | | |
|---|---|---|---|
| 401,290 | 4/89 | Main | 136—31 |
| 600,693 | 3/98 | Julien | 136—31 |
| 791,635 | 6/05 | Mann | 136—125 |
| 884,264 | 4/08 | Carpenter | 136—6 |
| 1,090,763 | 3/14 | Thomas | 136—126 |
| 2,499,239 | 2/50 | Williams | 136—125 |
| 2,641,624 | 6/53 | Winekler et al. | 136—125.2 |
| 2,932,680 | 4/60 | Andre. | |
| 2,945,078 | 7/60 | Chapman et al. | 136—30 |
| 2,970,181 | 1/61 | Corren | 136—143 |

FOREIGN PATENTS

| | | |
|---|---|---|
| 27,862 | 12/04 | Great Britain. |
| 163,992 | 7/22 | Great Britain. |
| 164,434 | 6/21 | Great Britain. |

WINSTON A. DOUGLAS, *Primary Examiner.*

JOSEPH REBOLD, JOHN R. SPECK, JOHN H. MACK, *Examiners.*